(12) United States Patent
Inoue et al.

(10) Patent No.: US 9,406,173 B2
(45) Date of Patent: *Aug. 2, 2016

(54) MAINTENANCE INFORMATION OUTPUT APPARATUS AND MAINTENANCE INFORMATION OUTPUT SYSTEM

(75) Inventors: Tetsuya Inoue, Tsu (JP); Koji Nakamura, Tsu (JP)

(73) Assignee: Nabtesco Corporation, Tokyo (JP)

( * ) Notice: Subject to any disclaimer, the term of this patent is extended or adjusted under 35 U.S.C. 154(b) by 878 days.

This patent is subject to a terminal disclaimer.

(21) Appl. No.: 13/443,321

(22) Filed: Apr. 10, 2012

(65) Prior Publication Data

US 2012/0203509 A1 Aug. 9, 2012

Related U.S. Application Data

(62) Division of application No. 12/090,926, filed as application No. PCT/JP2006/320967 on Oct. 20, 2006, now Pat. No. 8,195,429.

(30) Foreign Application Priority Data

Oct. 21, 2005 (JP) ................................ P2005-306823

(51) Int. Cl.
*G06F 15/00* (2006.01)
*G07C 3/00* (2006.01)
(Continued)

(52) U.S. Cl.
CPC .............. *G07C 3/00* (2013.01); *F16H 57/0402* (2013.01); *F16H 57/0405* (2013.01); *F16N 29/00* (2013.01)

(58) Field of Classification Search
USPC ........................................................ 702/184
See application file for complete search history.

(56) References Cited

U.S. PATENT DOCUMENTS

| 4,323,843 A | 4/1982 | Batham |
| 4,831,362 A | 5/1989 | Tsaprazis |
| 4,878,019 A | 10/1989 | Tsaprazis et al. |

(Continued)

FOREIGN PATENT DOCUMENTS

| EP | 1070874 A2 | 1/2001 |
| JP | 62-297717 A | 12/1987 |

(Continued)

OTHER PUBLICATIONS

Andre Verlinden, Laboratories at Work: Used Oil Analysis at WearCheck, Belgium, 11 pages, 1997 WearCheck Canada Inc.*

(Continued)

*Primary Examiner* — Tung S Lau
(74) *Attorney, Agent, or Firm* — Panitch Schwarze Belisario & Nadel LLP

(57) ABSTRACT

A maintenance information output system is provided that includes an iron amount detecting device, a receiver, a maintenance information output apparatus, and a controlling portion. The iron amount detecting device is attached to a speed reducer, and detects an amount of iron in a lubricant in the speed reducer. The receiver receives data of the amount of iron detected by the iron amount detecting device. The maintenance information output apparatus has an outputting portion which outputs maintenance information of the speed reducer. The maintenance information output apparatus has a receiving portion which receives the data from the receiver. When the amount of iron is equal to or larger than a threshold value, the controlling portion causes the outputting portion to output the maintenance information.

1 Claim, 5 Drawing Sheets

(51) Int. Cl.
*F16H 57/04* (2010.01)
*F16N 29/00* (2006.01)

(56) References Cited

U.S. PATENT DOCUMENTS

| | | | |
|---|---|---|---|
| 5,817,928 | A | 10/1998 | Garvey, III et al. |
| 2004/0218844 | A1 | 11/2004 | Tanaka et al. |
| 2005/0241437 | A1 | 11/2005 | Gray et al. |
| 2006/0167659 | A1 | 7/2006 | Miyasaka et al. |

FOREIGN PATENT DOCUMENTS

| | | | |
|---|---|---|---|
| JP | 01-164847 | A | 6/1989 |
| JP | 07-124889 | A | 5/1995 |
| JP | 10-069989 | A | 3/1998 |
| JP | 2001-318031 | A | 11/2001 |
| JP | 2002-262025 | A | 9/2002 |
| JP | 2002-286697 | A | 10/2002 |
| JP | 2004-093256 | A | 3/2004 |
| JP | 2004-301203 | A | 10/2004 |
| JP | 2004-309219 | A | 11/2004 |
| JP | 2005-092727 | A | 4/2005 |

OTHER PUBLICATIONS

Carl S. Byington, Advances in Real Time Oil Analysis, in Practicing Oil Analysis Nov. 2000, Nov. 2000, 6 pages.*
Decision of Refusal (English language translation) for Japanese Patent Application No. 2007-541065, mailed on Sep. 20, 2011, 5 pages.
Extended Search Report issued Jan. 19, 2016 in EP Appln. 06812096.3, 25 pages.

* cited by examiner

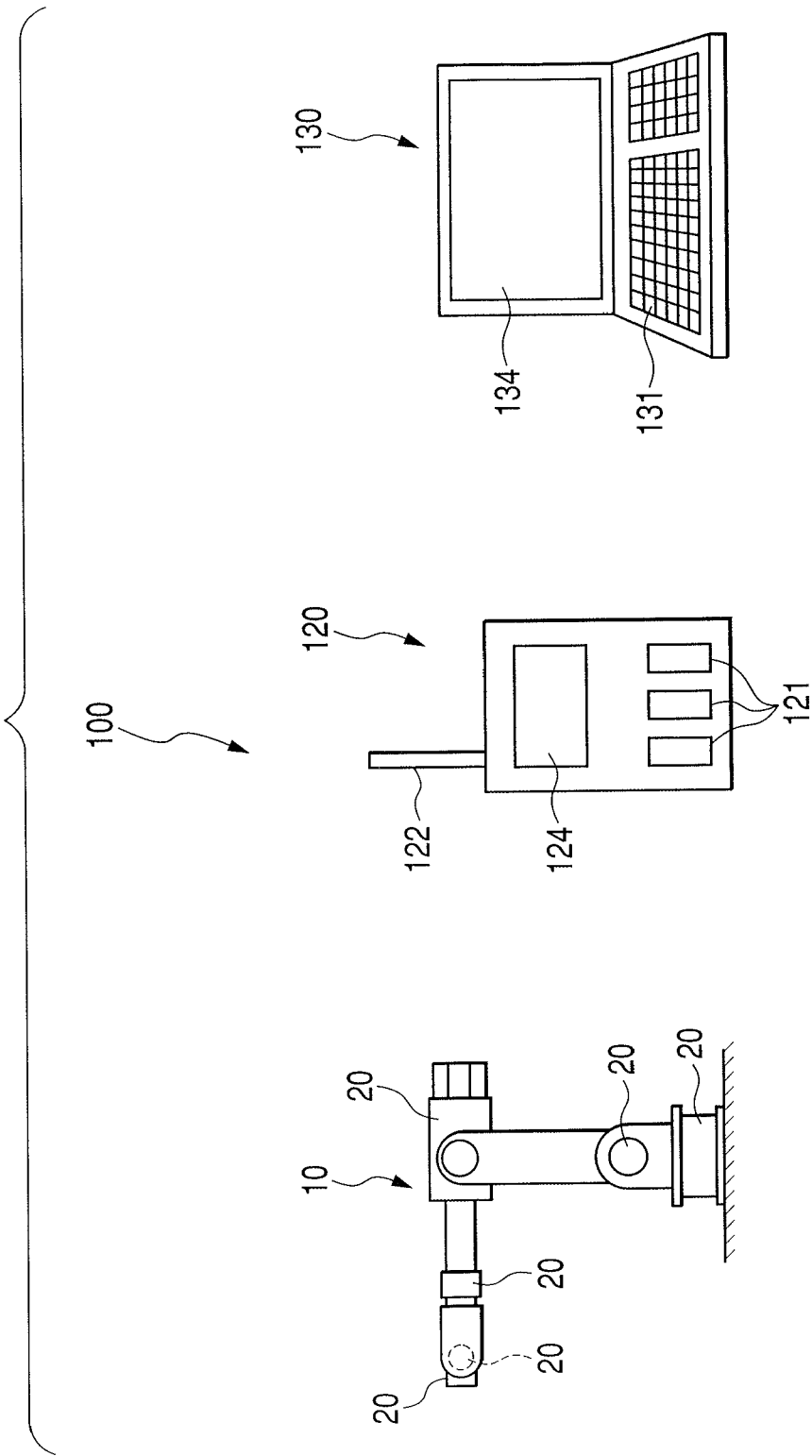

MAINTENANCE INFORMATION OUTPUT APPARATUS AND MAINTENANCE INFORMATION OUTPUT SYSTEM

CROSS-REFERENCE TO RELATED APPLICATIONS

This application is a divisional of co-pending U.S. patent application Ser. No. 12/090,926 filed Mar. 6, 2009, which, in turn, is a Section 371 of International Application No. PCT/JP2006/320967, filed Oct. 20, 2006, which was published in the Japanese language on Apr. 26, 2007, under International Publication No. WO 2007/046505 A1. The entire disclosures of each of these prior applications are incorporated herein by reference.

BACKGROUND OF THE INVENTION

1. Technical Field

The present invention relates to a maintenance information output apparatus which outputs maintenance information of a speed reducer used in an industrial robot, a machine tool, or the like.

2. Background Art

As a conventional maintenance information output apparatus, known is an apparatus in which the life of a speed reducer is calculated and accumulated at each sampling time from the generated torque, number of rotations, and accumulated operation time of a servo motor for driving a robot manipulator of an industrial robot, and, when the accumulated value exceeds a predetermined reference value, the need for inspection or replacement of the speed reducer is displayed (for example, see Patent Reference 1).

Patent Reference 1: JP-A-7-124889 (pages 2 and 3, FIGS. 1 and 2)

DISCLOSURE OF THE INVENTION

Problems that the Invention is to Solve

In a conventional maintenance information output apparatus, however, influences on the life of a speed reducer due to causes other than the generated torque, number of rotations, and accumulated operation time of a servo motor, such as those on the life of a speed reducer due to the atmosphere temperature, a lubrication failure in the speed reducer, assembly mismatching, deformation of a member, and the like are not considered, and the life of the speed reducer is predicted only on the basis of the generated torque, number of rotations, and accumulated operation time of the servo motor. Therefore, there is a problem in that maintenance information of a speed reducer used in an industrial robot is sometimes inadequate.

In a conventional maintenance information output apparatus, for example, there is a case that the need for inspection or replacement of a speed reducer is not displayed in spite that the speed reducer is actually at the end of the life, or the need for inspection or replacement of a speed reducer is displayed although the speed reducer is not actually at the end of the life.

The invention has been conducted in order to solve the problem of the conventional art. It is an object of the invention to provide a maintenance information output apparatus which can output maintenance information of a speed reducer used in an industrial robot, more adequately than the conventional art.

Means for Solving the Problems

The maintenance information output apparatus of the invention comprises: an outputting portion which outputs maintenance information of a speed reducer; and a controlling portion which, when an amount of iron in a lubricant in the speed reducer is equal to or larger than a threshold value, causes the outputting portion to output the maintenance information.

According to the configuration, on the basis of the amount of iron which is actually produced in the lubricant in the speed reducer as a result of wear of the speed reducer, the maintenance information output apparatus of the invention outputs maintenance information of the speed reducer. Therefore, the apparatus can output maintenance information of the speed reducer, more adequately than the conventional art.

In the maintenance information output apparatus of the invention, furthermore, the threshold value is disposed in plural steps, and the maintenance information is disposed in plural steps in accordance with the steps of the threshold value.

According to the configuration, the maintenance information output apparatus of the invention can allow the user to perform stepwise maintenance.

The maintenance information output system of the invention wherein the system comprises: an iron amount detecting device which is attached to a speed reducer, and which detects an amount of iron in a lubricant in the speed reducer; a receiver which receives data of the amount of iron detected by the iron amount detecting device; and a maintenance information output apparatus having an outputting portion which outputs maintenance information of the speed reducer, and the maintenance information output apparatus has: a receiving portion which receives the data from the receiver; and a controlling portion which, when the amount of iron is equal to or larger than a threshold value, causes the outputting portion to output the maintenance information.

According to the configuration, on the basis of the amount of iron which is actually produced in the lubricant in the speed reducer as a result of wear of the speed reducer, the maintenance information output system of the invention outputs maintenance information of the speed reducer. Therefore, the system can output maintenance information of the speed reducer, more adequately than the conventional art.

The maintenance information output method of the invention has a configuration in which an amount of iron in a lubricant in a speed reducer is detected, and, when the amount of iron is equal to or larger than a threshold value, maintenance information of the speed reducer is output.

According to the configuration, in the maintenance information output method of the invention, on the basis of the amount of iron which is actually produced in the lubricant in the speed reducer as a result of wear of the speed reducer, maintenance information of the speed reducer is output. Therefore, the method can output maintenance information of the speed reducer, more adequately than the conventional art.

Effect of the Invention

The invention can provide a maintenance information output apparatus which can output maintenance information of a speed reducer more adequately than the prior art.

The eccentric oscillation speed reducer of the invention wherein the speed reducer comprises: a first member having internal teeth; an external tooth member which has external teeth meshing with the internal teeth, which is engaged with a crankshaft, and which eccentrically oscillates; and a second member which is engaged with the external tooth member, and which is rotatable with respect the first member, the crankshaft and the external tooth member are housed in a space formed by the first member and the second member, and the speed reducer comprises an iron amount detecting device which is attached to at least one of the first member and the second member, and which detects an amount of iron in a lubricant in the space.

According to the configuration, the eccentric oscillation speed reducer of the invention can detect the amount of iron which is actually produced in the lubricant in the speed reducer as a result of wear of the speed reducer. On the basis of the detected amount of iron, maintenance information of the speed reducer is output. Therefore, maintenance information of the speed reducer can be output more adequately than the conventional art.

BRIEF DESCRIPTION OF THE DRAWINGS

FIG. 1 is a view of a maintenance information output system of an embodiment of the invention.

DETAILED DESCRIPTION OF THE INVENTION

Figure 2A:
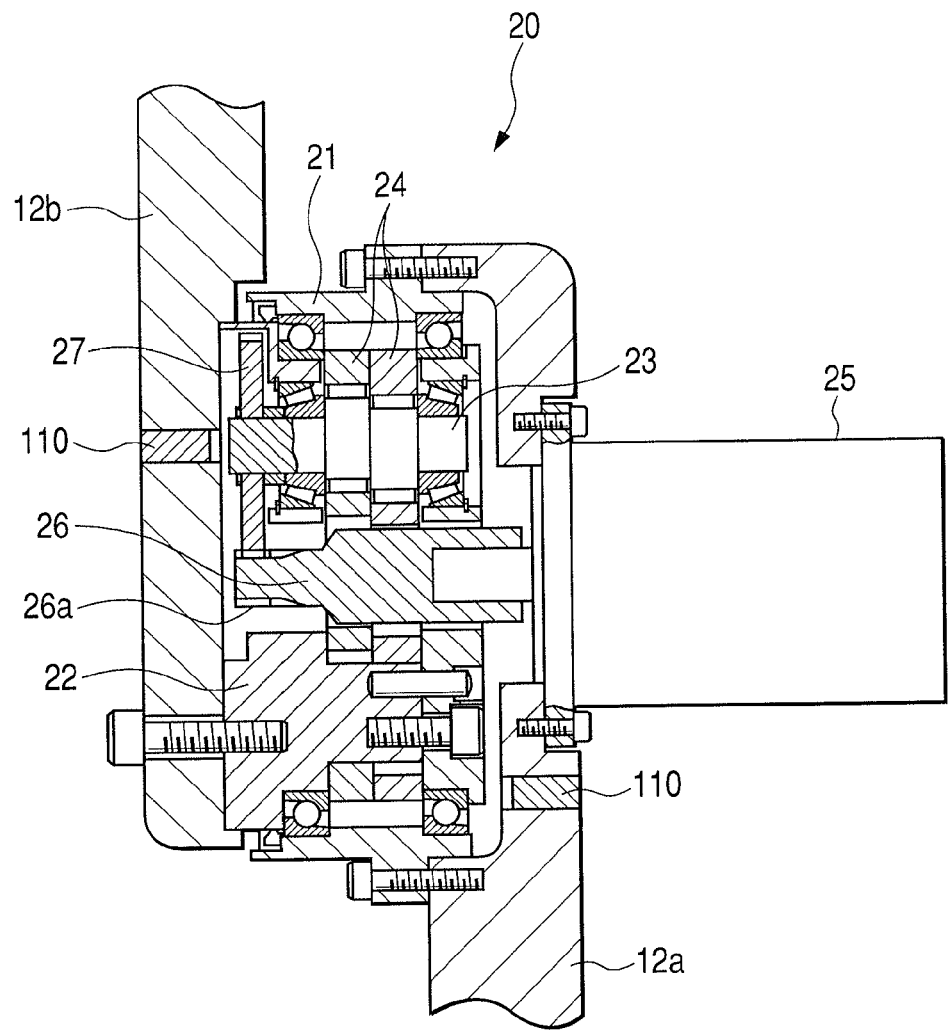
FIG. 2A is a section view of an eccentric oscillation speed reducer to which an iron amount detecting device of the maintenance information output system shown in FIG. 1 is attached.

Best Mode for Carrying Out the Invention

Hereinafter, an embodiment of the invention will be described with reference to the drawings.

First, the structure of a maintenance information output system of the embodiment will be described.

As shown in FIG. 1, the maintenance information output system 100 comprises: iron amount detecting devices 110 (see FIG. 2B) which are attached respectively to plural eccentric oscillation speed reducers 20 used in rotation transmitting portions of an industrial robot 10 placed in a production line, and which detect the amount of iron in a lubricant 20a (see FIG. 2B) in the speed reducers 20; a portable wireless receiver 120 which wirelessly receives data of the amounts of iron detected by the iron amount detecting devices 110; and a maintenance information output apparatus 130 which is a computer that is placed in a maintenance room separated from the production line, and that outputs maintenance information of the speed reducers 20.

Figure 2B:
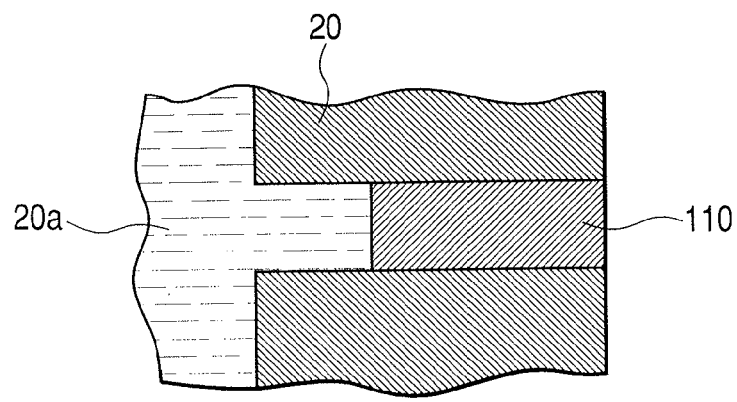
FIG. 2B is a section view of a portion in the vicinity of the iron amount detecting device in the speed reducer to which the iron amount detecting device of the maintenance information output system shown in FIG. 1 is attached.

For example, the eccentric oscillation speed reducer 20 shown in FIG. 2A is attached to a joint portion of the robot 10, and comprises: a one-side member 12a which constitutes the joint portion of the robot 10; an internal tooth member 21 which is fixed to the one-side member 12a by bolts, and which has internal teeth on the inner circumference; two external tooth members 24 each of which has external teeth meshing with the internal teeth, and which are engaged with a crankshaft 23 to eccentrically oscillate; a member 12b which constitutes another side of the joint portion of the robot 10; and a support member 22 which is fixed to the other member 12b by bolts, and which is engaged with the crankshaft 23 to be relatively rotatable with respect to the internal tooth member 21. In the speed reducer 20, a motor 25 is fixed to the one-side member 12a to supply a rotational driving force to the speed reducer 20. Namely, the rotation supplied from the motor 25 is input to the crankshaft 23 through: an input shaft 26 which is housed in the speed reducer 20; a small gear 26a which is formed in one end of the input shaft 26; and a large gear 27 which is fixed to one end of the crankshaft 23, and which meshes with the small gear 26a.

In the speed reducer 20, the one-side member 12a of the joint portion of the robot 10, and the internal tooth member 21 are integrated with each other to constitute one member of the speed reducer of the invention, and the member 12b which constitutes the other side of the joint portion of the robot 10, and the support member 22 are integrated with each other to constitute a second member. The first member and the second member perform relative rotary motion to function as the joint portion of the robot portion. The crankshaft 23 and the external tooth members 24 are housed in a space formed by the first member and the second member.

The iron amount detecting devices 110 which detect the amount of iron in the lubricant in the space are attached to the one member 12a and other member 12b that constitute the joint portion of the robot 10.

In the invention, the amount of iron in the lubricant 20a may be any kind of value as far as it indicates the amount of iron in the lubricant 20a, such as the mass, the concentration, and the like of iron in the lubricant 20a. The maintenance information of the speed reducers 20 means information for performing maintenance on the speed reducer 20, such as information for inspection or replacement of the speed reducer 20.

Figure 3:
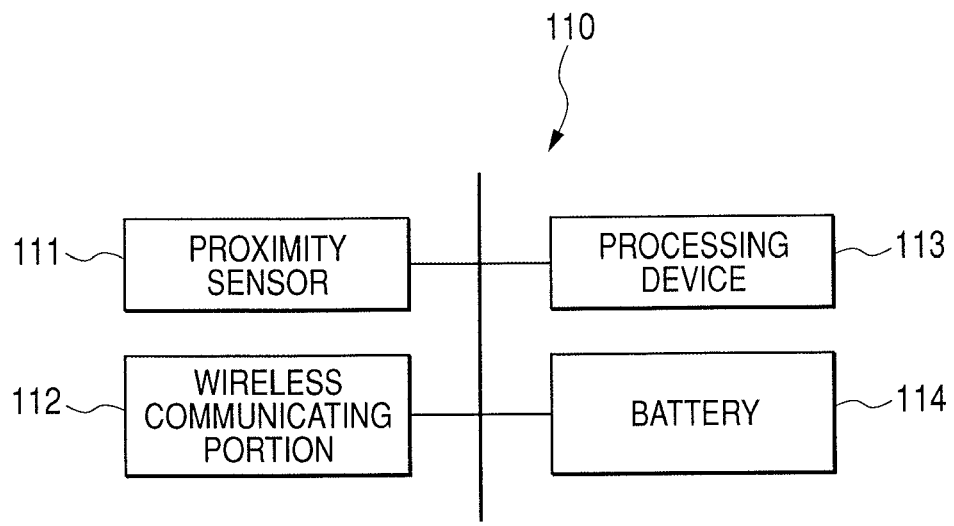
FIG. 3 is a block diagram of the iron amount detecting device of the maintenance information output system shown in FIG. 1.

As shown in FIG. 3, the iron amount detecting device 110 comprises: a proximity sensor 111 which detects the amount of iron in the lubricant 20a (see FIG. 2B) in the speed reducer 20 (see FIGS. 1 and 2A); a wireless communicating portion 112 which wirelessly communicates with an external apparatus; a processing device 113 which is configured by a CPU (Central Processing Unit), a ROM (Read Only Memory), a RAM (Random Access Memory), and the like, and which controls the operations of the proximity sensor 111 and the wireless communicating portion 112; and a battery 114 which supplies an electric power to the proximity sensor 111, the wireless communicating portion 112, and the processing device 113. Preferably, the proximity sensor 111 may be a sensor in which, even when a large number of detections are performed, the detection accuracy is hardly lowered. The battery 114 is preferably placed at a position where replacement of the battery 114 can be easily performed, such as an outer circumferential portion the speed reducer 20.

Figure 4:
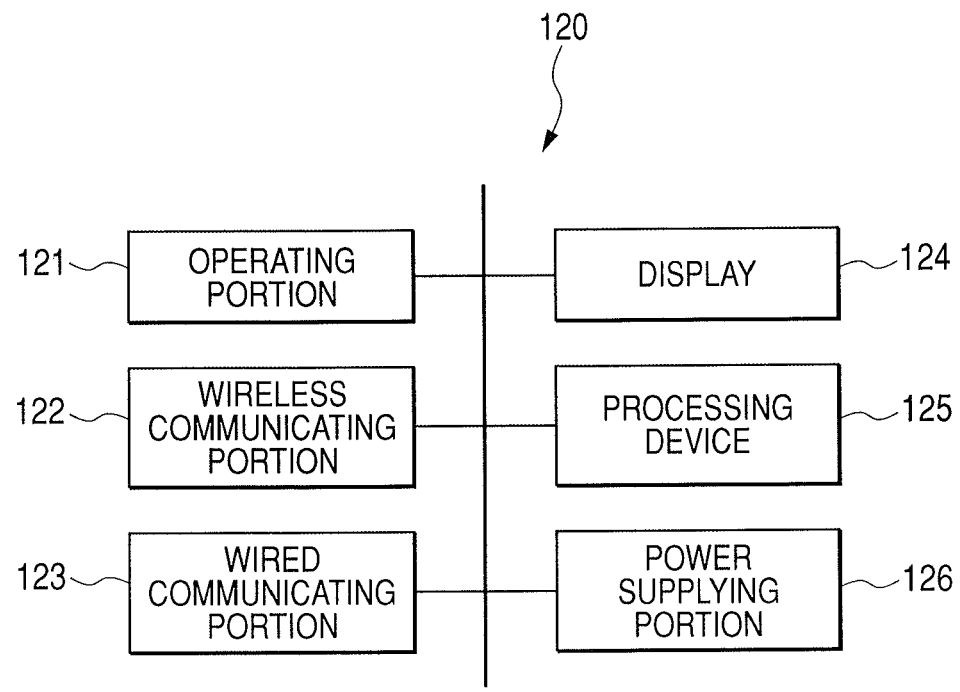
FIG. 4 is a block diagram of a portable wireless receiver of the maintenance information output system shown in FIG. 1.

As shown in FIG. 4, the portable wireless receiver 120 comprises: an operating portion 121 which is operated by the user; a wireless communicating portion 122 which wirelessly communicates with an external apparatus; a wired communicating portion 123 which communicates by wire with an external apparatus; a display 124 which performs various displays; a processing device 125 which is configured by a CPU, a ROM, a RAM, and the like, and which controls the operations of the wireless communicating portion 122, the wired communicating portion 123, and the display 124 in accordance with an operation on the operating portion 121;

and a power supplying portion 126 which supplies an electric power to the wireless communicating portion 122, the wired communicating portion 123, the display 124, and the processing device 125.

Figure 5:
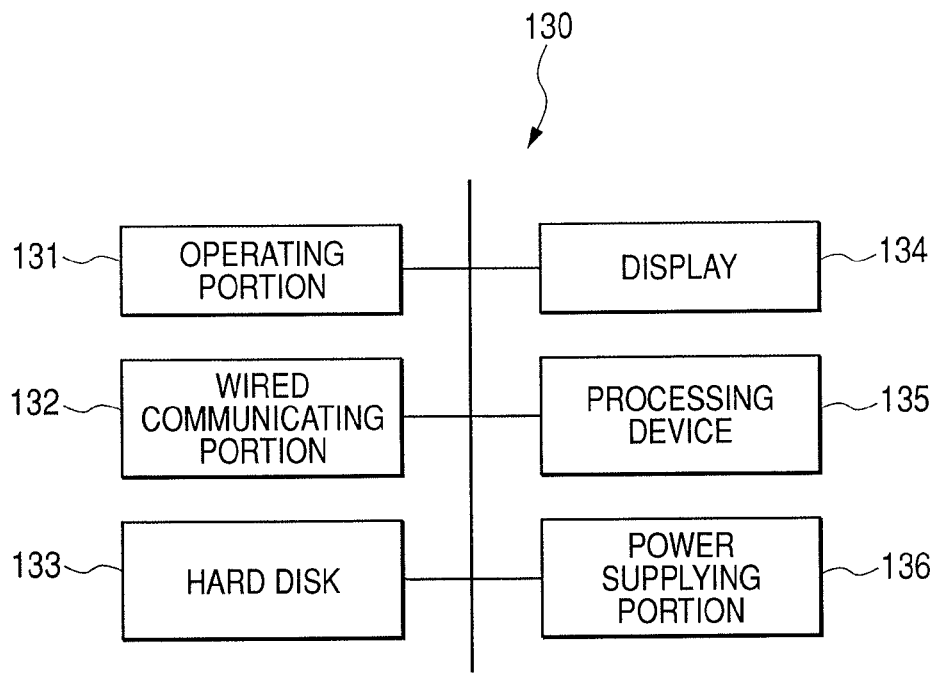
FIG. 5 is a block diagram of a maintenance information output apparatus of the maintenance information output system shown in FIG. 1.

As shown in FIG. 5, the maintenance information output apparatus 130 comprises: an operating portion 131 which is operated by the user; a wired communicating portion 132 which communicates by wire with an external apparatus; a hard disk 133 which stores data received by the wired communicating portion 132; a display 134 which performs various displays; a processing device 135 which is configured by a CPU, a ROM, a RAM, and the like, and which controls the operations of the wired communicating portion 132, the hard disk 133, and the display 134 in accordance with an operation on the operating portion 131; and a power supplying portion 136 which supplies an electric power to the wired communicating portion 132, the hard disk 133, the display 134, and the processing device 135. The wired communicating portion 132 receives data of the amount of iron from the portable wireless receiver 120 (see FIG. 1), and constitutes a receiving portion. The display 134 outputs maintenance information of the speed reducer 20 (see FIG. 1), and constitutes an outputting portion. The processing device 135 controls the display 134 to output maintenance information of the speed reducer 20 when the amount of iron obtained from the portable wireless receiver 120 is equal to or larger than a threshold value, and constitutes a controlling portion. The processing device 135 may operate in accordance with programs which are previously stored in the ROM, or alternatively operate in accordance with programs which are externally obtained through a recording medium or a network.

Next, the operation of the maintenance information output system 100 will be described.

First, the operation when the portable wireless receiver 120 obtains data of the amounts of iron in the lubricants 20a in the speed reducers 20 from the iron amount detecting devices 110, and stores the data will be described.

When the user carries the portable wireless receiver 120 to the vicinity of the industrial robot 10 and selects one of the plural speed reducers 20 of the industrial robot 10 through the operating portion 121 of the portable wireless receiver 120, the processing device 125 of the portable wireless receiver 120 requests through the wireless communicating portion 122, in the case where the wireless communicating portion 112 of the iron amount detecting device 110 attached to the speed reducer 20 which is selected by the user can communicate with the wireless communicating portion 122, the iron amount detecting device 110 attached to the speed reducer 20 which is selected by the user, to transmit data of the amount of iron in the lubricant 20a in the speed reducer 20.

When the iron amount detecting device 110 receives the request for transmission of the data of the amount of iron in the lubricant 20a in the speed reducer 20 from the portable wireless receiver 120 through the wireless communicating portion 112, the processing device 113 of the iron amount detecting device detects the amount of iron in the lubricant 20a in the speed reducer 20 by the proximity sensor 111, and transmits data of the detected amount of iron to the portable wireless receiver 120 through the wireless communicating portion 112.

When the portable wireless receiver 120 receives the data of the amount of iron transmitted through the wireless communicating portion 122 from the wireless communicating portion 112 of the iron amount detecting device 110, the processing device 125 of the portable wireless receiver stores the received data of the amount of iron into the RAM, and then displays the data on the display 124.

The portable wireless receiver 120 performs an operation similar to that described above on the plural speed reducers 20, whereby, with respect to each of the plural speed reducers 20, data of the amount of iron in the lubricant 20a in the speed reducer 20 can be stored.

Next, the operation when the maintenance information output apparatus 130 obtains data of the amounts of iron in the lubricants 20a in the speed reducers 20 from the portable wireless receiver 120, and stores the data will be described.

When the user carries the portable wireless receiver 120 to the vicinity of the maintenance information output apparatus 130, connects the portable wireless receiver 120 with the maintenance information output apparatus 130 through a communication cable which is not shown, and requests the maintenance information output apparatus 130 through the operating portion 131 to obtain the data of the amounts of iron stored in the RAM of the processing device 125 of the portable wireless receiver 120, the processing device 135 of the maintenance information output apparatus 130 requests the portable wireless receiver 120 through the wired communicating portion 132 to transmit the data of the amounts of iron stored in the RAM of the processing device 125.

When the portable wireless receiver 120 receives the request for transmission of the data of the amounts of iron stored in the RAM from the maintenance information output apparatus 130 through the wired communicating portion 123, the processing device 125 of the portable wireless receiver transmits all the data of the amounts of iron stored in the RAM to the maintenance information output apparatus 130 through the wired communicating portion 123.

When the maintenance information output apparatus 130 receives the data of the amounts of iron transmitted through the wired communicating portion 132 from the wired communicating portion 123 of the portable wireless receiver 120, the processing device 135 of the maintenance information output apparatus stores the received data of the amount of iron into the hard disk 133.

Figure 6:
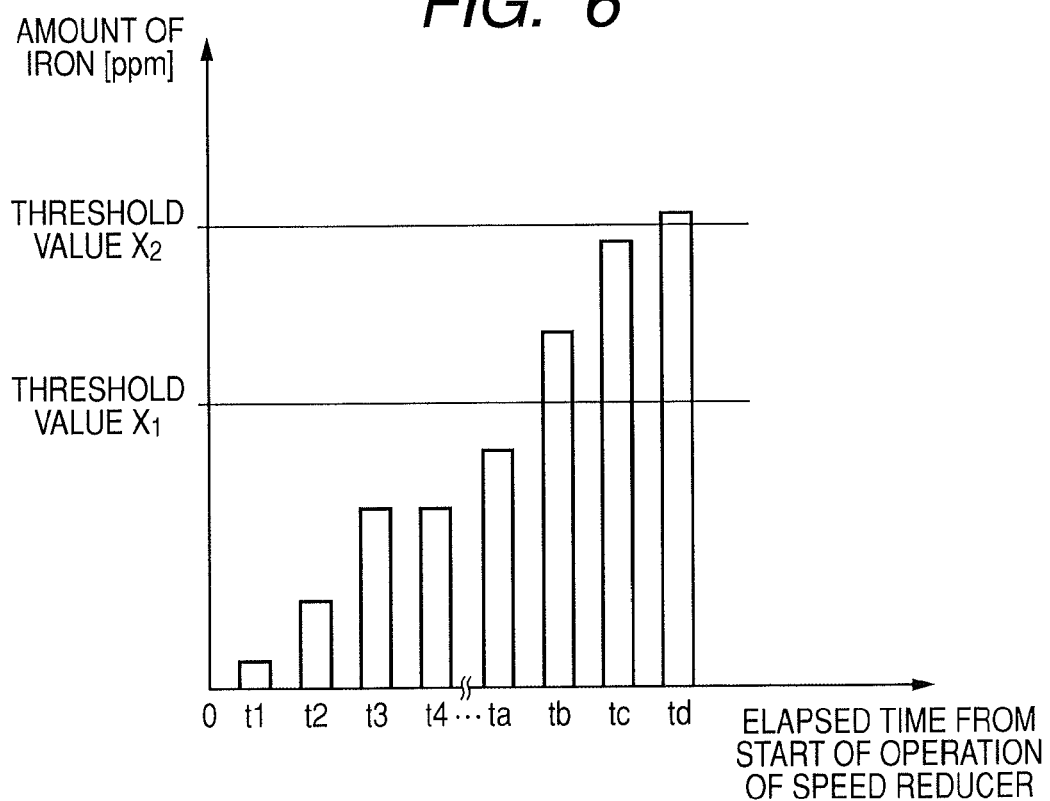
FIG. 6 is a view showing a time series change of an amount of iron in a lubricant in the speed reducer.

Next, with respect to each of the plural speed reducers 20 of the industrial robot 10, the processing device 135 displays the latest value of the amounts of iron stored in the hard disk 133, and a time series such as shown in FIG. 6 on the display 134.

Figure 7:
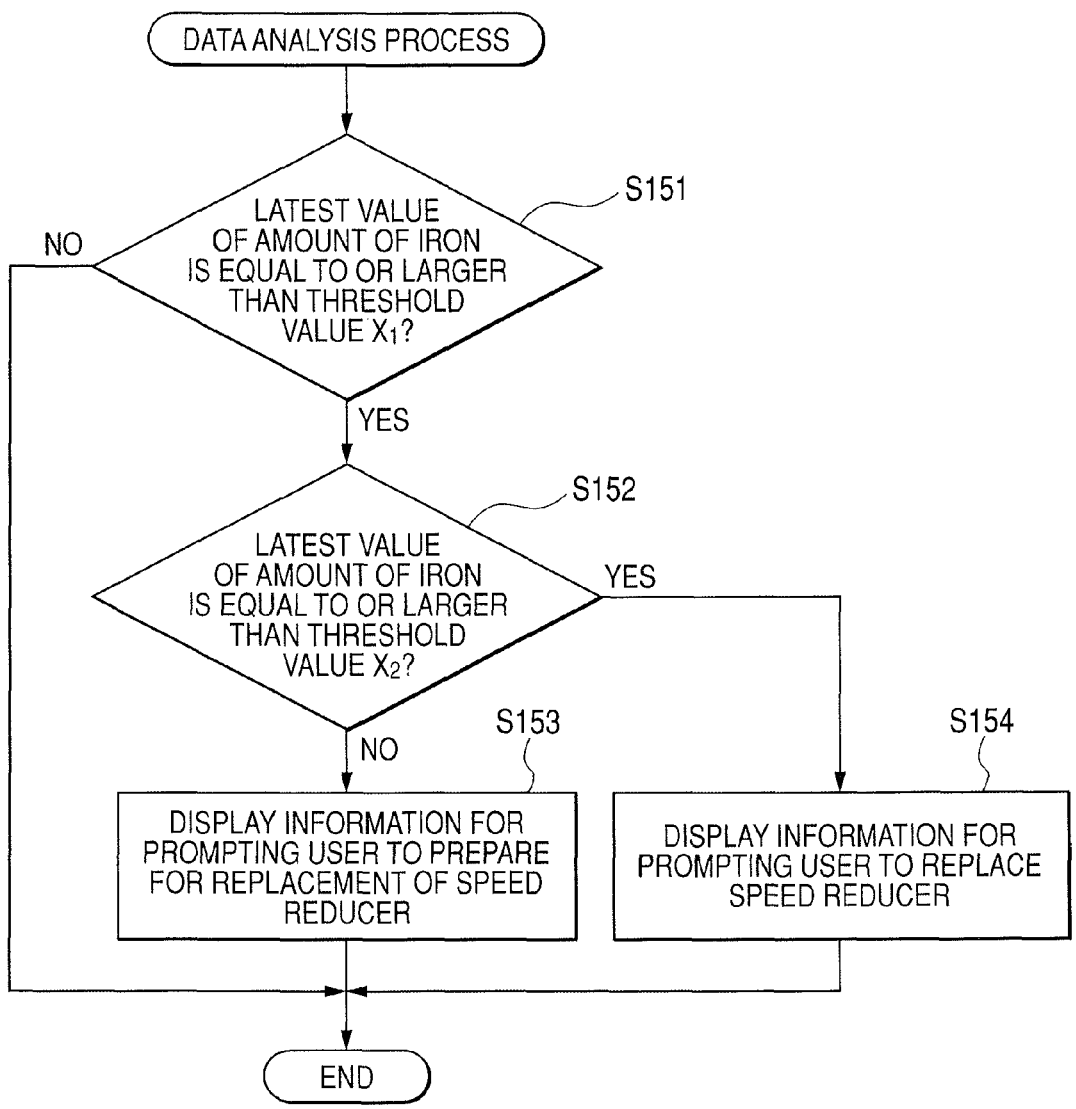
FIG. 7 is a flowchart of a data analysis process of the maintenance information output apparatus shown in FIG. 5.

Then, with respect to each of the plural speed reducers 20 of the industrial robot 10, the processing device 135 performs a data analysis process shown in FIG. 7.

In the data analysis process shown in FIG. 7, the processing device 135 determines whether the latest value of the amounts of iron stored in the hard disk 133 is equal to or larger than a threshold value $x_1$ (see FIG. 6) or not (S151).

If the processing device 135 determines in S151 that the latest value of the amounts of iron stored in the hard disk 133 is smaller than the threshold value $x_1$ as between times t1 to ta shown in FIG. 6, the processing device ends the data analysis process. If the processing device 135 determines in S151 that the latest value of the amounts of iron stored in the hard disk 133 is equal to or larger than the threshold value $x_1$ as between times tb to td shown in FIG. 6, the processing device determines whether the latest value of the amounts of iron stored in the hard disk 133 is equal to or larger than a threshold value $x_2$ (see FIG. 6) or not (S152).

If the processing device 135 determines in S152 that the latest value of the amounts of iron stored in the hard disk 133 is smaller than the threshold value $x_2$ as in times tb and tc shown in FIG. 6, the processing device displays information for prompting the user to prepare for replacement of the speed reducer 20, as maintenance information on the display 134 (S153), and ends the data analysis process. For example, the information for prompting the user to prepare for replacement of the speed reducer 20 is information for instructing preparation of a replacement speed reducer within two months. In S153, in addition to display of the information for prompting the user to prepare for replacement of the speed reducer 20 on the display 134, the processing device 135 may display also information indicating how many days later the user preferably performs a series of operations of causing the maintenance information output apparatus 130 to obtain the data of the amount of iron in the lubricant 20a in the speed reducer 20 from the iron amount detecting device 110 through the portable wireless receiver 120 and perform the data analysis process, as maintenance information on the display 134. If the processing device 135 determines that the latest value of the amounts of iron stored in the hard disk 133 is equal to or larger than the threshold value $x_2$ as in time td shown in FIG. 6, the processing device displays information for prompting the user to replace the speed reducer 20, as maintenance information on the display 134 (S154), and ends the data analysis process.

The processing device 135 is configured so that, after the device receives through the wired communicating portion 132 the data of the amount of iron transmitted through the wired communicating portion 123 of the portable wireless receiver 120, the device displays the latest value of the amounts of iron and a time series on the display 134. Alternatively, the device may be configured so that, when requested by the user through the operating portion 131, the device displays the latest value of the amounts of iron and a time series on the display 134.

The processing device 135 is configured so that, after the device receives through the wired communicating portion 132 the data of the amount of iron transmitted through the wired communicating portion 123 of the portable wireless receiver 120, the device performs the data analysis process shown in FIG. 7. Alternatively, the device may be configured so that, when requested by the user through the operating portion 131, the device performs data analysis process shown in FIG. 7.

As described above, on the basis of the amount of iron which is actually produced in the lubricant 20a in the speed reducer 20 as a result of wear of the speed reducer 20, the maintenance information output apparatus 130 outputs maintenance information of the speed reducer 20. Therefore, the apparatus can output maintenance information of the speed reducer 20, more adequately than the conventional art.

In the maintenance information output apparatus 130, furthermore, threshold values of plural steps or the threshold values $x_1$, $x_2$ are disposed, and the maintenance information is disposed in plural steps in accordance with the threshold values $x_1$, $x_2$. Therefore, the maintenance information output apparatus can allow the user to perform stepwise maintenance.

The maintenance information output system 100 is configured so as to output maintenance information in the form of display. Alternatively, maintenance information may be output by a method other than display. For example, the maintenance information output system 100 may output maintenance information in the form of sound.

In the maintenance information output system 100, the two steps of threshold values or the threshold values $x_1$, $x_2$ are disposed. Alternatively, three or more steps of threshold values may be disposed.

In the maintenance information output system 100, the communication between the portable wireless receiver 120 and the maintenance information output apparatus 130 is performed by wire. Alternatively, the communication may be performed by wireless.

The maintenance information output system 100 comprises the portable wireless receiver 120 which obtains data of the amounts of iron from the iron amount detecting devices 110, and the maintenance information output apparatus 130 which performs the data analysis process on the basis of the data of the amounts of iron obtained from the portable wireless receiver 120. Alternatively, a single device may obtain data of the amounts of iron from the iron amount detecting devices 110, and performs the data analysis process.

An eccentric oscillation speed reducer is used as the speed reducer 20. The invention can be applied to any type of speed reducer as far as steel products are used in components of the speed reducer, and the structure of the speed reducer itself may not be formed as an eccentric oscillation speed reducer. However, it is advantageous to apply the invention to a speed reducer comprising plural rotation transmitting portions of an industrial robot, because maintenance information of plural reductions can be simultaneously managed.

In the case of an eccentric oscillation speed reducer which has a relatively complex internal structure and is hardly disassembled, particularly, it is advantageous to apply the invention and to be able to know necessity/unnecessity of maintenance.

In the above, the description has been made with using the example in which the iron amount detecting devices 110 are attached to both the members 12a, 12b that constitute the joint portion of the robot. The placement of the iron amount detecting device is not restricted to that in which the iron amount detecting devices are attached to both the members that constitute the joint portion. One iron amount detecting device may be disposed only on one side. Plural iron amount detecting devices may be placed on one face and at positions opposed to plural crankshafts, respectively. In the above, the example in which the iron amount detecting devices are attached to the members that constitute the joint portion of the robot has been described. In a speed reducer which is unitized in a state where components of the speed reducer itself are housed in a housing or the like and lubricating oil is hermetically enclosed, maintenance information can be obtained while an iron amount detecting device is attached to the housing.

INDUSTRIAL APPLICABILITY

The maintenance information output apparatus and maintenance information output system of the invention output maintenance information of a speed reducer on the basis of the amount of iron which is actually produced in the lubricant in the speed reducer as a result of wear of the speed reducer. Therefore, the apparatus and the system can output maintenance information of the speed reducer, more adequately than the prior art. Also in the case where the invention is applied to an eccentric oscillation speed reducer, moreover, maintenance information of the speed reducer can be obtained on the basis of the detected amount of iron.

We claim:

1. A maintenance information output system comprising:
   an iron amount detecting device which is attached to a speed reducer, and which detects an amount of iron in a lubricant in the speed reducer;
   a wireless receiver which receives data of the amount of iron detected by the iron amount detecting device; and
   a maintenance information output apparatus including:
   an outputting portion which outputs maintenance information of the speed reducer,
   a wired receiving portion which receives the data from the wireless receiver, and a controlling portion which, when the amount of iron is equal to or larger than a threshold value, causes the outputting portion to output the maintenance information, wherein the controlling portion functions during operation of the speed reducer.

\* \* \* \* \*